Patented May 1, 1951

2,550,961

UNITED STATES PATENT OFFICE 2,550,961

OLEORESINOUS VARNISHES AND METHODS FOR PREPARING THEM

John J. Bradley, Jr., Winchester, Mass., assignor to Boston Varnish Company, Everett, Mass., a corporation of Massachusetts No Drawing. Application July 20, 1948, Serial No. 39,802

4 Claims. (Cl. 106—222)

1

This invention relates to oleoresinous varnishes and more particularly to an oleoresinous varnish of improved characteristics and methods of making the same from glyceride oils, or mixtures thereof, in which appreciable proportions of the double bonds are in conjugated positions.

The conjugated unsaturated glyceride oils, such as China-wood oil, oiticica oil, isomerized linseed oil or dehydrated castor oil, are a desirable type of glyceride oil for the manufacture of oleoresinous varnishes, either alone or as a part of a batch containing other drying oils in which conjugation is slight or absent, such as linseed oil, but the processing of batches in which an appreciable proportion of the double bonds of the glyceride oil is conjugated on a commercial scale by the traditional varnish-maker's procedure, has presented very serious difficulties.

Oils of the conjugated unsaturation type, e. g., China-wood oil, have critical polymerization temperatures (500°–550° F.), above which the reaction is exothermic and difficult to control, and they rapidly advance to a high viscosity or useless gel state. If lower and safer temperatures are employed, the resulting varnish generally has inferior film forming properties, poor drying characteristics and poor resistance to water and to chemicals. Thus, only a few resins will gasproof China-wood oil below 500° F. and none below about 450° F. In addition, as with other glyceride oils, these conjugated unsaturated oils, and the resin which is present with them in a varnish composition, darken rapidly in the varnish kettle at the required high temperatures, above 400° F., due to oxidation. When lighter colored products are required, the heating must be carried out in an atmosphere of an inert gas, such as carbon dioxide or nitrogen, to prevent oxidation. The use of such gases is inconvenient and expensive. Also, the heretofore unavoidable high temperatures employed result in substantial losses of material due to decomposition and volatilization and due to formation of insoluble "skins" or "gels" which must be discarded.

An object of the invention is to provide an oleo-resinous varnish of superior drying and film-forming characteristics.

Another object of the invention is to provide a process for the manufacture of varnishes from glyceride oils, or mixtures thereof, in which an appreciable proportion of the unsaturation is of the conjugated type, which process may be carried out at approximately room temperature, can be controlled by an unskilled operator to produce uniform products, does not cause discoloration of the varnish by oxidation, gives higher yields than

2 conventional heat bodying processes, and produces a product of superior color and drying and film-forming characteristics. Other objects and advantages of the invention will become apparent from the following description of my presently preferred processes and products.

In accordance with the invention a drying oil, or drying oil mixture, having on the average not less than about 5.5 carbon-to-carbon double bonds per molecule and having not less than about 15% of the unsaturation in conjugated form, is polymerized at a temperature in the range 60°–100° F. together with an oil-soluble varnish-maker's resin in the presence of a volatile solvent and a catalyst comprising an organic boron trifluoride complex in an amount between 0.25% and 4.0% expressed as percent equivalent boron trifluoride based on the total non-volatile content of the batch. The reaction proceeds rapidly and uniformly, at rates satisfactory for commercial use, at temperatures far below the conventional varnish-making temperatures, and, with many varnish compositions, even at room temperature. The rate and degree of polymerization may conveniently be determined by viscosity measurements. For example, such measurements can very easily be made at suitable intervals by the Gardner-Holdt tube method. When the reaction has proceeded to the desired extent, as indicated by the viscosity reading, the polymerization is stopped by the addition of a basic substance or by washing with water.

This stage will be reached in from 4 minutes or less to 3 or 4 hours. Thereafter, the batch is completed by clarifying it by the conventional procedure in the case where a basic substance is used, or, if the reaction is checked with water, by separating the aqueous phase containing water-soluble hydrates of the boron trifluoride, and then drying by distillation or desiccation.

The invention will be further illustrated by the following examples, in which typical oleoresinous varnish compositions are converted by my process into varnishes of enhanced drying and film-forming characteristics.

Example I

An 18 gallon oil length varnish was made on the following formula:

|  | Parts |
|---|---|
| China-wood oil | 125 |
| Rosin-modified phenol-formaldehyde resin (Amberol F-7) | 100 |
| Linseed oil | 15.6 |
| Mineral spirits | 223 |
| (Solvesso No. 100) Aromatic hydrocarbon | 9.0 |

The mixture of oils of this formula has, on the average, about 7.2 double bonds per molecule, of which about 80% are in conjugated positions. The resin was first dissolved in the mineral spirits in the cold in a kettle and to the resulting solution was added, with stirring, 7.5 parts of boron trifluoride-diethyl ether complex dissolved in 9 parts of Solvesso No. 100. The amount of catalyst was equivalent to 1.49% of boron trifluoride, based on the non-volatile constituents (oils plus resin). The mixed linseed and China-wood oils were then added and the batch stirred at 75° F. continuously until the reaction had reached the desired stage as indicated by a viscosity of G–H on the Gardner-Holdt scale. This viscosity was reached in about 16 minutes. 7.5 parts of calcium oxide were then stirred into the batch to check the reaction by inactivation of the catalyst. The batch was then completed by removing the excess of lime and the catalyst-lime complex from it by filtration in the conventional way.

Another batch of the same formula was processed into a varnish in the conventional manner, involving heating the resin and China-wood oil in a varnish kettle to 565° F. in 40 minutes, addition of the linseed oil to lower the temperature, addition of the thinners at 450° F., filtering and addition of solvent to obtain the same desired non-volatile content. Driers were added to each batch equivalent to 0.05% cobalt metal and 0.4% lead metal, based on varnish non-volatile, and films 0.003 inch thick were formed on glass plates from each batch.

Comparative data on the batches are as follows:

|  | Example I | Conventional |
| --- | --- | --- |
| Per cent non-volatile | 50 | 50. |
| Viscosity (Gardner-Holdt) | G–H | G–H. |
| Color (Gardner 1933) | 8–9 | 12–13. |
| Total batch losses | 0.2% | 2.0%. |
| Dry, tack-free | 2 hours | 8 hours. |
| Dry, through and hard | 4 hours | 16 hours. |
| Hardness | Excellent | Good-excellent. |
| Toughness | do | Do. |
| Water resistance 24 hour immersion (at 75° F.) | Slight whitening | Slight whitening. |
| Recovery after 24 hour immersion (at 75° F.) | Complete, ½ hour | Complete, ¾ hour. |

*Example II*

A 40 gallon oil length varnish was made on the following formula:

|  | Parts |
| --- | --- |
| China-wood oil | 276 |
| Phenol-formaldehyde resin, (Bakelite-4036) | 100 |
| Linseed oil | 39 |
| Mineral spirits | 270 |
| Aromatic hydrocarbon (Solvesso #100) | 36 |

The mixture of oils of this formula has about the same amount of unsaturation and conjugation as the oils of Example I. The resin was placed in a varnish kettle and dissolved in the mineral spirits in the cold. To the resulting solution was added 4 parts boron trifluoride-diethyl ether complex, dissolved in 36 parts aromatic hydrocarbon (Solvesso No. 100) (equivalent to 0.46% boron trifluoride by weight of the non-volatiles). The mixed linseed oil and China-wood oil were then added to the kettle with stirring, and stirring was continued at 79° F. Samples were taken at two minute intervals for viscosity determinations. The viscosity reached D in about 6 minutes. About 4 parts of calcium hydroxide, slurried in a small amount of ethyl alcohol, were added to the batch with continued stirring to stop the reaction and the batch was then completed by clarifying it by filtration.

A second batch of the same formula was made into a varnish by conventional procedure involving heating the China-wood oil and resin in a varnish kettle to 540° F. in about 40 minutes, addition of the linseed oil, cooling to 450° F., addition of the thinners, filtration and incorporation of additional solvent to make up losses and restore the desired non-volatile content. Cobalt drier was incorporated in both batches, in the amount of 0.08% cobalt metal on non-volatiles, and films of 0.003 inch wet film thickness were drawn down on glass plates from each batch.

The two batches showed the following properties:

|  | Example II | Conventional |
| --- | --- | --- |
| Per cent non-volatile | 57.5 | 58. |
| Viscosity (Gardner-Holdt) | D–E | D. |
| Color (Gardner 1933) | 9 | 12–13. |
| Total batch losses | 0.3% | 2.5%. |
| Dry, tack free | 2 hours | 7 hours. |
| Dry, through and hard | 8 hours | 16 hours. |
| Hardness | Excellent | Good. |
| Toughness | do | Excellent. |
| Water resistance 24 hour immersion (at 75° F.) | No whitening | No whitening. |
| Recovery after 24 hour immersion (at 75° F.) | Complete, ¾ hour | Complete, ¾ hour. |

*Example III*

A 40 gallon varnish was prepared with the following formulation:

|  | Parts |
| --- | --- |
| Oiticica oil | 275 |
| Linseed oil | 38 |
| 100% phenolic resin (Kyanac 201) | 79 |
| Ester gum (Kyanite 301) | 21 |
| Mineral spirits | 270 |
| (Solvesso No. 100) aromatic hydrocarbon | 37 |
| Boron trifluoride-diethyl ether complex | 4 |

The mixture of oils of this formula has, on the average, about 7.3 carbon-to-carbon double bonds per molecule, of which about 77% are in conjugated positions.

The resins were dissolved and the catalyst and oils added in the same manner as in Examples I and II. The reaction was allowed to proceed for about 4 minutes at 81° F., at which time a viscosity of E had been attained. The reaction was then stopped and the varnish clarified, as in Example II.

Results were as follows:

| Percent non-volatile | 57 |
| --- | --- |
| Viscosity (Gardner-Holdt) | G–H |
| Color (Gardner 1933) | 9–10 |
| Total batch losses percent | 0.3 |

Driers were incorporated in the amounts of 0.035% cobalt metal and 0.3% lead metal, based on varnish non-volatile, and the varnish was drawn down on glass at 0.003 wet film thickness. Drying and film properties were as follows:

| Dry, tack free hours | 7 |
| --- | --- |
| Dry, through and hard do | 18 |
| Hardness | Good–Excellent |
| Toughness | Excellent |
| Water resistance 24 hour immersion (at 75° F.) | No whitening |
| Recovery after 24 hours immersion (at 75° F.) | Complete, ¾ hour |

Example IV

A 25 gallon varnish was made on the following formula:

| | Parts |
|---|---|
| China-wood oil | 59 |
| Dehydrated castor oil (J viscosity) | 59 |
| Pentaerythritol ester gum (Kyanite 351) | 60 |
| Mineral spirits | 157.5 |
| Aromatic hydrocarbon (Solvesso No. 100) | 20 |
| Boron trifluoride-diethyl ether complex | 6.8 |

The mixture of oils of this formula has, on the average, about 6.2 double bonds per molecule, of which about 61% are in conjugated positions.

The resin was dissolved and the catalyst and oils were added in the same manner as in Examples I, II and III. The amount of catalyst was equivalent to about 2.75% of boron trifluoride based on varnish non-volatiles. The reaction was allowed to proceed at 77° F. for 75 minutes, at which time a viscosity of G-H had been attained. The reaction was then stopped and the varnish clarified as in preceding examples.

Results were as follows:

| | |
|---|---|
| Percent non-volatile | 50 |
| Viscosity (Gardner-Holdt) | G-H |
| Color (Gardner 1933) | 7-8 |
| Total batch losses_____percent | 0.3 |

Driers were incorporated in the amounts of 0.05% cobalt metal and 0.5% lead metal, based on varnish non-volatile content, and the varnish was drawn down on glass at 0.003" wet film thickness. Drying and film properties were:

| | |
|---|---|
| Dry, tack free_____hours | 7 |
| Dry, through and hard_____do | 10 |
| Hardness | Excellent |
| Toughness | Excellent |
| Water resistance 24 hour immersion (at 75° F.) | Slight whitening |
| Recovery after 24 hours immersion (at 75° F.) | Complete, ½–¾ hour |

Example V

A 40 gallon varnish was prepared on the following formula:

| | Parts |
|---|---|
| China-wood oil | 158 |
| Linseed oil | 157 |
| Ester gum (Kyanite 301) | 21 |
| 100% phenolic resin (Bakelite 4036) | 79 |
| Mineral spirits | 274 |
| Aromatic hydrogen (Solvesso No. 100) | 38 |
| Boron trifluoride-diethyl ether complex | 8 |

The mixture of oils of this formula has, on the average, about 6.8 double bonds per molecule, of which about 48% are in conjugated positions.

The resin was dissolved in the mineral spirits and the catalyst and oils added in the same manner as in preceding examples. The amount of catalyst employed was equivalent to about 1.1% of boron trifluoride, based on varnish non-volatile content. The reaction was allowed to proceed at 75° F. for 35 minutes, at which time a viscosity of E-F had been attained. The reaction was then terminated and the varnish clarified as described in preceding examples.

Results were as follows:

| | |
|---|---|
| Percent non-volatile | 57 |
| Viscosity (Gardner-Holdt) | E-F |
| Color (Gardner 1933) | 8-9 |
| Total batch losses_____percent | 0.2 |

Driers were incorporated in the varnish in amounts equivalent to 0.06% cobalt metal and 0.5% lead metal, based on varnish non-volatile content, and the varnish was drawn down on glass at 0.003 inch wet film thickness. Drying and film properties were as follows:

| | |
|---|---|
| Dry, tack free_____hours | 7–8 |
| Dry, through and hard_____do | 12–14 |
| Hardness | Good–Excellent |
| Toughness | Good–Excellent |
| Water resistance 24 hour immersion (at 75° F.) | Some whitening |
| Recovery after 24 hour immersion (at 75° F.) | Complete, 1 hour |

Example VI

A 40 gallon varnish was prepared with the following formula:

| | Parts |
|---|---|
| China-wood oil | 63 |
| Linseed oil | 252 |
| Ester gum (Kyanite 301) | 21 |
| 100% phenolic resin (Bakelite 4036) | 79 |
| Mineral spirits | 274 |
| Aromatic hydrocarbon (Solvesso No. 100) | 38 |
| Boron trifluoride-diethyl ether complex | 10.7 |

The mixture of oils of the formula has, on the average, about 6.5 double bonds per molecule, of which about 20% are in conjugated positions.

The resin was dissolved in the mineral spirits and the catalyst and oils added as described in preceding examples. The amount of catalyst employed was equivalent to about 1.23% of boron trifluoride based on the varnish non-volatile content. The reaction was allowed to proceed at 100° F. for 28 minutes, at which time a viscosity of G had been attained. The reaction was then terminated and the varnish clarified as described in preceding examples.

The results were:

| | |
|---|---|
| Percent non-volatile | 57 |
| Viscosity (Gardner-Holdt) | G |
| Color (Gardner 1933) | 8-9 |
| Total batch losses_____percent | 0.3 |

Driers were added in amounts equivalent to 0.07% cobalt metal and 0.5% lead metal based on varnish non-volatile content, and the varnish was drawn down on glass at 0.003 inch wet film thickness. Drying and film properties were as follows:

| | |
|---|---|
| Dry, tack free_____hours | 10–12 |
| Dry, through and hard_____do | 16–18 |
| Hardness | Good |
| Toughness | Good |
| Water resistance 24 hour immersion (at 75° F.) | Considerable whitening |
| Recovery after 24 hour immersion (at 75° F.) | Complete, 1½ hours |

Example VII

A 40 gallon varnish was prepared with the following formula:

| | Parts |
|---|---|
| China-wood oil | 79 |
| Dehydrated castor oil (J viscosity) | 236 |
| Ester gum (Kyanite 301) | 21 |
| 100% phenolic resin (Bakelite 4036) | 79 |
| Mineral spirits | 274 |
| Aromatic hydrocarbon (Solvesso No. 100) | 38 |
| Boron trifluoride-diethyl ether complex | 10.1 |

The mixture of oils of this formula has, on the average, about 5.9 double bonds per molecule, of which about 45% are in conjugated positions.

The resin was dissolved and the catalyst and oils added to the resin solution in the manner described in preceding examples. The amount of catalyst used was equivalent to about 1.2% boron trifluoride based on the varnish non-volatile content. The reaction was allowed to proceed at 100° F. for about 80 minutes, at which time a viscosity of G-H had been attained.

centration within the ranges stated above is the type or character of the drying oil as respects its degree of unsaturation and average percentage conjugation.

The following table illustrates some effects obtained by varying the composition of the oil in the formulas of Examples VI and VII. All the runs were made at 100° F.

| Run | Example | Oil, Per Cent | | | | | Polymerization | | |
| | | China-Wood Oil | Linseed Oil | Dehydrated Castor | Double Bonds per Mol. | Per Cent Conjugation | Per Cent Catalyst | Time, Minutes | Viscosity |
|---|---|---|---|---|---|---|---|---|---|
| 1 | VI | 20 | 80 | | 6.5 | 20 | 1.2 | 28 | G |
| 2 | | 10 | 90 | | 6.5 | 10 | 2.5 | 150 | No Change. |
| 3 | VII | 25 | | 75 | 5.9 | 45 | 1.2 | 100 | G-H |
| 4 | | 10 | | 90 | 5.7 | 34 | 2.5 | 300 | C |

Results were as follows:

Percent non-volatile _____ 57
Viscosity (Gardner-Holdt) _____ G-H
Color (Gardner 1933) _____ 8-9
Total batch loss _____percent__ 0.3

Driers were added in amounts equivalent to 0.07% cobalt metal and 0.5% lead metal based on varnish non-volatile content, and the varnish was drawn down on glass at 0.003 inch wet film thickness. Drying and film properties were as follows:

Dry, tack free _____hours__ 9-10
Dry, through and hard _____do____ 16-18
Hardness _____ Good-Excellent
Toughness _____ Good-Excellent
Water resistance 24 hour immersion (at 75° F.) _____ Slight whitening
Recovery after 24 hour immersion (at 75° F.) _____ Complete, ¾ hour The process may be varied considerably with respect to the type and composition of the varnish components. For instance, not only the ratio of oil to resin, but also the composition of the oil may be varied. Thus, I may use China-wood oil or oiticica oil or other highly conjugated oils, either alone or in a wide variety of mixtures with other drying oils, such as linseed oil, dehydrated castor oil, fish oils, soya bean oil, etc.

The composition of the fatty acids of most of the common drying oils is known to at least a good degree of approximation. It is, therefore, possible to estimate the average number of carbon-to-carbon double bonds per molecule of oil which is a measure of total unsaturation. Similarly, it is possible to estimate the average number of these double bonds which exist in conjugated positions. The ratio of this latter number to the total number of double bonds is a measure of "percentage conjugation." These estimates may be based on analyses of the fatty acid constituents of the oils as given in the literature. The values I have estimated for some of the individual oils are:

| | Average Total Unsaturation (Double Bonds/Molecule) | Average Per Cent Conjugation |
|---|---|---|
| China-wood Oil | 7.33 | 89.2. |
| Oiticica Oil | 7.47 | 86.7. |
| Dehydrated Castor Oil | 5.52 | 25.4 low viscosity oil. |
| Linseed Oil | 6.38 | substantially none. |

The most important factor governing the choice of reaction temperature and catalyst con- Comparison of Run 2 with Run 1 shows the decrease in polymerization rate accompanying a decrease in percent conjugation of the unsaturation, despite the fact that the total unsaturation expressed as the average number of double bonds per molecule is approximately equal in the two cases and the concentration of catalyst is higher in Run 2. Runs 3 and 4 shows a similar result with a different combination of oils. Comparison of Run 4 with Run 1 shows the decrease in polymerization rate resulting from a decrease in total unsaturation, despite the larger percentage of conjugation and the higher catalyst concentration in Run 4. From this data it is apparent that both the total unsaturation and the degree of conjugation are important factors in determining the suitability of an oil, or, mixture of oils, for use under the conditions of my process. In general, it appears that as the total amount of unsaturation decreases the minimum percentage of conjugation necessary for a satisfactory polymerization rate increases. The difficulty of correlating these two factors and the influence of other factors—as for instance, the type and concentration of the resin to be used—makes it necessary, at present, to determine the suitability of a proposed varnish composition by experimental trial. However, in general, I prefer to employ an oil, or mixture of oils, having on the average not less than about 5.5 carbon-to-carbon double bonds per molecule and having not less than about 15% of the unsaturation in conjugated form.

My process may be carried out with any suitable oil-soluble varnish maker's resin. These include the oil-soluble natural resins, such as the copals, the dammars, the East Indias and rosin, etc.; the oil soluble synthetic or semi-synthetic resins, such as the cumars, rosin esters of polyhydric alcohols, rosin-modified phenolic resins, the so-called 100% phenolic resins, rosin modified maleic resins, etc.; and also such alkyd resins as possess satisfactory miscibility with oils, and generally any varnish-maker's resin which is oil-soluble under the required processing conditions. Such resins I refer to herein as "oil-soluble" resins. The amount of resin may be such that the varnish contains from 30% to 700% glyceride oil, or oils, by weight on the resin.

The varnish compositions employed in my process may contain any suitable solvent, providing the solvent is a satisfactory medium for the dispersion or dissolution of the resin to be employed. Suitable solvents, include the aromatic hydrocarbons, such as toluene and xylene, the higher solvency petroleum naphthas, mineral spirits, V. M. P. naphtha, dipentene, turpentine, etc. Any desired ratio of solvent to varnish non-volatile constituents may be employed, provided the proportion of solvent is sufficient to give a satisfactory dispersion or solution of the resin, but I prefer to include 30% to 2400% of solvent by weight of the resin.

The catalysts I employ are substances from the group consisting of the coordination compounds or complexes of boron trifluoride and an organic compound having one or more pairs of unshared electrons. Typical substances with which boron trifluoride forms coordination compounds are diethyl ether, dibutylether, phenyl methyl ether, methyl alcohol, ethyl alcohol, phenol, acetone, methyl ethyl ketone and acetic acid. The substances of this class are referred to herein as boron trifluoride-organic compound coordination complexes. The coordination complexes are usually liquids or soluble solids and, in many cases, are readily soluble or dispersible in the common varnish solvents and oils. They are easy to handle, and can be readily and uniformly distributed throughout the varnish batch without producing localized over-reaction. While different complexes are qualitatively equivalent, their individual reactivities depend on the binding-strength of the coordinating substance and, to a degree at least, upon the volatility of this substance. For instance, in varnishes we have found the approximate order of reactivity of the diethyl ether, dibutyl ether and phenol complexes to be: diethyl ether complex > dibutyl ether complex > phenol complex. While the diethyl ether complex is generally useful, it may be desirable in some circumstances to use a less active catalyst, or to use a mixture of catalysts of different reactivities.

The amount of catalyst may be varied considerably depending upon the character of the oil, the nature of the resin, the ratio of resin to oil, the amount of solvent present, the temperature employed, the activity of the catalyst, and the polymerization rate desired.

Other conditions being the same the rate of polymerization increases with increase in the concentration of the catalyst. The magnitude of the effect varies with the varnish composition, and the temperature but may be illustrated by the following results obtained with the formula of Example I. In Example I, with a catalyst concentration of 1.49% a viscosity of G-H was obtained at 75° F. in 16 minutes. When the catalyst was reduced to 1.0% there was no appreciable increase in the original viscosity (less than A) in 4 hours. On the other hand, when the catalyst concentration was raised to 1.8%, gelation occurred in 5 minutes. In general, the preferred concentration of catalyst is equivalent to from 0.25% to 4.0% by weight of boron trifluoride based on the varnish non-volatile content (e. g. resin plus oil), when the non-volatile content is in the normal range of about 45% to 55%. For higher or lower non-volatile contents, the catalyst concentration may be decreased or increased, respectively. Under these conditions polymerization occurs readily, the time required ranging from 4-5 minutes, or even less, to 3-4 hours, depending on the composition of the varnish, the temperature and the concentration and activity of the catalyst.

My process may be carried out in either open or closed vessels. While the former have been used successfully, the detrimental effect of atmospheric moisture on the activity of the catalyst sometimes makes it desirable to use closed vessels which can be suitably protected against entrance of atmospheric moisture. Stirring or mechanical agitation while not essential are generally desirable and the polymerization vessels are, therefore, preferably equipped for this purpose. The vessels may also be equipped with jackets or coils for heating or cooling, although for many varnish compositions neither is required. Auxiliary equipment, such as condensers or temperature recorders, may be employed as desired.

My process is well adapted to operation in a continuous manner. Such continuous operation may satisfactorily be carried out by making the necessary additions of catalyst, oils, and reaction terminators, to the resin (or varnish) solution at suitable points or stages while the solution is flowing through a system of pipes, tubes, or open or closed chambers.

To arrest the reaction, I may employ, instead of the calcium oxide of the examples, other basic substances such as other alkali metal or alkaline earth metal oxides, alkali or alkaline earth metal carbonates or hydroxides, amines, or ammonia. Basic substances form stable, relatively inert complexes with boron trifluoride. Many of these are solid and insoluble in the varnish and can be removed by filtration. A particularly satisfactory procedure is to add about 1.5 to 2.0 times the weight of catalyst of an alkaline earth oxide or hydroxide slurried in a small amount of a lower alcohol. The slurry is preferably thoroughly dispersed in the varnish by stirring or mechanical agitation. During the stirring the varnish generally becomes considerably lighter in color, thereby indicating deactivation of the catalyst. The varnish then may be clarified by filtration, the use of a filter aid generally being desirable.

The polymerization rate increases with increase in the temperature. In Example VI a viscosity of G was obtained in 28 minutes at 100° F. With the same formula at 77° F. there was no significant increase in the original viscosity (less than A) in 150 minutes.

Because of the low temperatures and short reaction times characteristic of my process the loss in thinners and other volatile constituents of the batch is reduced to approximately one-tenth the loss experienced when the varnish is bodied by the traditional cooking at high temperatures. In the conventional process the losses resulting from thermal decomposition of the resins and the oils may amount to as much as 1% to 3% of the weight of the resin and oil present in the initial charge, depending somewhat upon the temperatures employed for the particular composition. The loss in volatile solvents, which normally are added to the kettle after the temperature has reached 400°-480° F., to check polymerization, may be as great as 2%-3% of the added solvent.

The products of my process are radically and fundamentally different from and superior to the products of the ordinary processes employing heat bodying of the oils. I have found that my process causes no discoloration of the oils or resins, which result I attribute to the presence of the thinner and to the low temperatures employed. The completed varnish products are superior in color by several units on the standard scale. Most surprising is the behaviour of the products of my process during drying. The varnishes dry much faster than varnishes of identical formulation which have been made by the standard methods involving heating to temperatures above 400° F.

Having thus fully disclosed my invention, I claim:

1. The process for the production of an oleoresinous varnish of improved color and drying characteristics which comprises forming a solution or dispersion in a hydrocarbon solvent of an oil-soluble varnish resin and an unsaturated glyceride drying oil, the weight of the solvent being from 30% to 2400% of the weight of the resin, and the oil present containing on the average more than 5.5 double bonds per molecule of oil, of which at least 15% are in conjugated position, and a coordination complex of boron trifluoride and an organic compound selected from the class consisting of ethers, alcohols, acids, and ketones equivalent to 0.25% to 4.0% by weight of boron trifluoride based on the varnish non-volatile content, maintaining said mixture at a temperature in the range 60° F. to 100° F. for less than 4 hours and until the viscosity reaches a varnish consistency, adding a basic substance to the resulting varnish in an amount sufficient to react with substantially all of the boron trifluoride-organic compound coordination complex present in the mixture, and removing the reaction product from the varnish.

2. The process for the production of an oleoresinous varnish of improved color and drying characteristics which comprises forming a solution or dispersion in a hydrocarbon solvent of an oil-soluble varnish resin and an unsaturated glyceride drying oil or oils, the weight of the solvent being from 30% to 2400% of the weight of the resin, and the oil having on the average more than 5.5 double bonds per molecule of oil of which more than 15% are in conjugated position, and a coordination complex of boron trifluoride and an organic compound selected from the class consisting of ethers, alcohols, acids, and ketones equivalent to 0.25% to 4.0% by weight of boron trifluoride based on the varnish non-volatile content, maintaining said mixture at a temperature in the range of 60° F. to 100° F. for less than 4 hours until the viscosity reaches a varnish consistency, adding water to the resulting varnish in an amount at least sufficient to form water-soluble hydrates with substantially all of the boron trifluoride-organic compound coordination complex present in the mixture, and then separating and removing the aqueous phase.

3. An oleoresinous varnish of improved drying characteristics and color comprising the product of the process of claim 1.

4. An oleoresinous varnish of improved drying characteristics and color comprising the product of the process of claim 2.

JOHN J. BRADLEY, Jr.

REFERENCES CITED

The following references are of record in the file of this patent:

UNITED STATES PATENTS

| Number | Name | Date |
|---|---|---|
| 2,229,305 | Pratt | Jan. 21, 1941 |
| 2,380,394 | Berger et al. | July 31, 1945 |
| 2,440,000 | Berger et al. | Apr. 20, 1948 |
| 2,441,105 | Socolofsky | May 4, 1948 |